United States Patent [19]

Sayles

[11] Patent Number: 4,744,299
[45] Date of Patent: May 17, 1988

[54] IMPERMEABLE LINER-BARRIER FOR PROPELLANTS CONTAINING A HIGH CONTENT OF CARBORANE BURNING RATE ACCELERATOR

[75] Inventor: David C. Sayles, Huntsville, Ala.

[73] Assignee: The United States of America as represented by the Secretary of the Army, Washington, D.C.

[21] Appl. No.: 484,104

[22] Filed: Apr. 1, 1983

[51] Int. Cl.[4] .............................................. F42B 1/00
[52] U.S. Cl. ................................................... 102/290
[58] Field of Search ........................................ 102/290

[56] References Cited

U.S. PATENT DOCUMENTS

| | | | |
|---|---|---|---|
| 3,954,701 | 5/1976 | Schaffling | 102/290 |
| 3,999,382 | 12/1976 | Clifford et al. | 102/290 |
| 4,187,215 | 2/1980 | Wrightson | 102/290 |
| 4,304,185 | 12/1981 | Sayles | 102/290 |
| 4,363,273 | 12/1982 | Luebben et al. | 102/290 |
| 4,375,522 | 3/1983 | Braun | 102/290 |

Primary Examiner—Edward A. Miller
Attorney, Agent, or Firm—Werten F. W. Bellamy; John M. Petruncio; Jack W. Voigt

[57] ABSTRACT

Disclosed is a liner-barrier system which is impermeable when cured to the high concentrations of carboranyl burning rate accelerator which are incorporated into ultrahigh-burning rate propellants which are being developed for advanced interceptors. The liner-barrier composition, when uncured, comprises a polyvinyl butyral resin coblended with thermosetting resins, such as, phenolic, epoxy etc., that employs triphenylbismuthine as a quick cure catalyst, 4,5-epoxycyclohexylmethyl 4',5'-epoxycyclohexyl carboxylate and polyisocyanate as curative and crosslinking agents to further modify the liner-barrier formulation by reacting with the secondary hydroxyl groups. Further modification of the liner-barrier formulation is achieved by incorporation of aluminum powder to impart additional properties of impermeability. The uncured liner-barrier composition contains from 8.90 to about 10.21 weight percent solids in a solvent blend of isopropyl acetate and isopropyl alcohol which comprises from about 89.79 to about 91.10 percent by weight of the uncured composition.

3 Claims, No Drawings

IMPERMEABLE LINER-BARRIER FOR PROPELLANTS CONTAINING A HIGH CONTENT OF CARBORANE BURNING RATE ACCELERATOR

DEDICATORY CLAUSE

The invention described herein may be manufactured, used, and licensed by or for the Government for governmental purposes without the payment to me of any royalties thereon.

BACKGROUND OF THE INVENTION

A solid propellant rocket motor generally employs a rocket motor case, insulation, a liner composition, and a solid propellant grain in the order listed as viewed from the outer motor case to the solid propellant grain contained therein.

The functions of the motor case and insulation are well defined in the art. With the advancement of the solid propulsion art as a result of employing higher burning rate propellants, improvements in motor case materials and insulations have been needed to continue their functions in accordance with the requirements of the advanced system.

Likewise, improved liner materials have been required to be developed to meet additional conditions for the advanced propulsion systems. Additional functional requirements have also been added to the liner material, particularly, in its function as a liner-barrier material. It is a liner-barrier material for use with a propellant grain containing a high content of carboranyl burning rate accelerator to which the present invention relates.

The function of the liner is: (a) to provide the bond between the propellant and insulation with adequate adhesive strength to ensure that the interfacial bond will be capable of withstanding all of the stresses to which the propulsion subsystem may be subjected during ignition, launch, maneuver, etc., and (b) to function as a barrier to the migration of the liquid carboranyl burning rate accelerator and the other mobile constituents into the insulation, and, thus, deplete the amount of accelerator in the propellant on storage, and, consequently, adversely affect the burning rate.

To meet the combined functional needs set forth hereinabove for a liner-barrier material, it is necessary to provide a composite material wherein the primary constituent in the liner-barrier has compatibility with many resins. It is also necessary that the primary constituent be capable of being modified to further enhance the composite liner-barrier mechanical and impermeability properties.

Therefore, an object of this invention is to provide an impermeable liner-barrier for use with solid rocket propellants containing a high content of carbonaryl burning rate accelerator.

Another object of this invention is to provide an impermeable liner-barrier that is comprised of primary butyral resins which have been prepared with predetermined proportions of acetal, hydroxyl and acetate groups.

Still a further object of this invention is to provide an impermeable liner-barrier employing embedment granules and for use with a double-base propellant (such as GBZ propellant) having tensile strengths in the range of 350–400+ psi, as compared to the conventional double-base and composite propellants whose tensile strength fall in the range of 200–250 psi, and wherein the impermeable liner-barrier has increased impact resistance, peel strength, shear strength, etc. so that the bond at the interface of propellant and liner remains intact because of the enhanced adhesive properties of the liner-barrier.

SUMMARY OF THE INVENTION

The impermeable liner-barrier of this invention is comprised of polyvinyl butyral resins as the primary constituent, a blend of epoxy-phenolic resins which function as crosslinking agents and tackifiers in the liner-barrier system, polyisocyanate curing and crosslinking agent, triphenylbismuthine to accelerate the crosslinking reaction by the polyisocyanate, and aluminum powder to increase the barrier to migration of carboranlymethyl propionate catalyst from the solid propellant composition.

DESCRIPTION OF THE PREFERRED EMBODIMENT

The impermeable liner-barrier of this invention has a typical composition based on a primary constituent of polyvinyl butyral resins having a vinyl alcohol content from about 11 to about 19 weight percent, a vinyl acetate content of about 1.0 weight percent, and vinyl butyral content of about 80–88 weight percent. These polyvinyl butyral resins have a weight average degree of polymerization ranging from about 500 to about 3500.

Table I sets forth the approximate composition of the preferred polyvinyl butyral resins employed in the liner-barrier formulation. As determined by test data the liner-barrier formulation containing Butvar B72A is rated superior to those liner-barrier compositions containing Butvar B76 or 98.

TABLE I

APPROXIMATE COMPOSITION OF POLYVINYL BUTYRAL RESINS

| BUTVAR DESIGNATION | VINYL ALCOHOL CONTENT (WT. %) | VINYL ACETATE CONTENT (WT. %) | VINYL BUTYRAL CONTENT (WT. %) | WEIGHT AVERAGE DEGREE OF POLYMERIZATION (APPROXIMATE MOLECULAR WEIGHTS) |
|---|---|---|---|---|
| B-72A | 19 | 1.0 | 80 | 3500 |
| B-76 | 11 | 1.0 | 88 | 750 |
| B-98 | 19 | 1.0 | 80 | 500 |

Polyvinyl butyral resins are preferred for the primary constituent in the instant liner-barrier developments because they are compatible with many resins and confer such improvements as: increased impact resistance, peel strength, shear strength, etc.

The preparation of polyvinyl butyral resins from vinyl acetate involves the following steps: (a) polymerization of vinyl acetate monomer into polyvinyl acetate; (b) partial hydrolysis of polyvinyl acetate to polyvinyl alcohol; (c) reaction of polyvinyl alcohol with n-butyraldehyde to produce polyvinyl butyral/acetate resin.

Polyvinyl alcohol cannot be prepared directly. An indirect synthesis route needs to be used because polyvinyl alcohol cannot be prepared directly from the vinyl alcohol monomer because this monomer does not exist, as such, because it is a tautomer of acetaldehyde with the equilibrium strongly in favor of acetaldehyde.

The polyvinyl alcohol intermediate is derived from polyvinyl acetate and contains varying percentages of both hydroxyl and acetate groups, as depicted by Structure 1 below.

Structure 1:
STRUCTURE OF POLYVINYL ALCOHOL

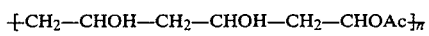

The conditions for the formation of polyvinyl butyral and the other acetals needs to be closely controlled by regulating the concentration of the particular aldehyde and polyvinyl alcohol in order to synthesize polymers which contain predetermined proportions of acetal, hydroxyl and acetate groups. The final product may be represented by the stylized structure which is shown as Structure 2 below.

Structure 2:
STRUCTURE OF POLYVINYL BUTYRAL

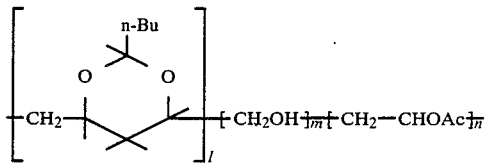

Modification of the polyvinyl butyral by coblending with thermosetting resins, such as, phenolic, epoxy, etc., is one approach that has been employed in this disclosure to obtain the balance of properties which are needed for the liner to meet the requirements necessary so that it is usable with an ultrahigh-burning rate, composite-modified, double-base propellant. Further modifications to reduce the permeability of the liner is achieved through the incorporation of either leafing or non-leafing aluminum powder. In addition, since the polyvinyl butyral contains secondary hydroxyl groups, the liner formulation can be further modified by crosslinking with polyisocyanates. This crosslinking will further reduce its permeability. Reaction of polyvinyl butyral with polyisocyanates is portrayed as illustrated by Reaction 1 below.

Reaction 1:

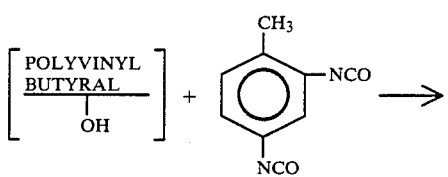

-continued
Reaction 1:

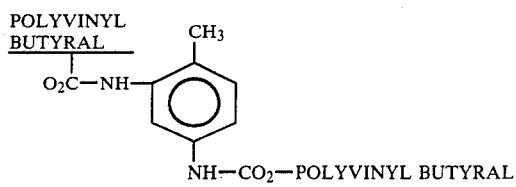

REACTION OF POLYVINYL BUTYRAL WITH TOLUENE DIISOCYANATE

A composition of a liner-barrier for propellants containing a carboranyl compound catalyst, such as, carboranylmethyl propionate, and which is particularly resistant to penetration by carbonarylmethyl propionate, comprises polyvinyl butyral (BUTVAR B-72/90/98) about 4.6 parts by weight, phenolic resin of about 2.3 parts by weight, DEMODUR II (polyisocyanate curing agent) of about 1.8 parts by weight, and a solvent blend (isopropyl acetate about 2 parts and isopropyl alcohol about 1 part) of about 89 parts by weight. This formulation contains about 4.71 percent by weight polyvinyl butyral, about 2.35 percent by weight phenolic resin (of the novolac type formed by reaction of phenol and formaldehyde in presence of acid catalysts to yield ortho- and para-links at random), about 1.84 percent by weight polyisocyanate curing agent, and about 91.10 percent by weight of the specified solvent blend.

Other examples of liner formulations in which polyvinyl butyral resins are combined with epoxy-phenolic resin blends are presented in Table II below. Phenolic resins function both as crosslinking agents and tackifiers in the liner systems. A wide choice of phenolic resins are available. Some of these are: Resinox 433, Plyophen 5023, and BKPA-5940 which are commonly referred to as novolac resins. Reaction of polyvinyl butyral with phenolformaldehyde resin is depicted by Reaction 2 also presented hereinbelow.

The polyvinyl butyral resins are commercially available from several commercial sources, such as, Monsanto Chemical Co., Union Carbide Co., etc. The approximate composition ranges of the polyvinyl butyral resins which have been found to be of utility in the compounding of liners for composite-modified double-base propellants are: Butvar B-72A, B-76, and B-98. Their approximate compositions are presented in Table I hereinabove.

TABLE II
TYPICAL COMPOSITIONS OF LINERS BASED ON POLYVINYL BUTYRAL RESINS

| | LINER COMPOSITION | | | |
|---|---|---|---|---|
| INGREDIENT | A PARTS BY WT. | A PER- CENT BY WT. | B PARTS BY WT. | B PER- CENT BY WT. |
| Polyvinyl butyral resin* | 40.71 | 4.66 | 40.71 | 4.78 |
| 4,5-Epoxycyclohexyl-methyl 4',5'-epoxycyclohexyl carboxylate** | 13.275 | 1.52 | 13.275 | 1.56 |
| Novolac resin*** | 20.355 | 2.33 | 11.505 | 1.35 |
| Triphenylbismuthine | 10.62 | 1.22 | 10.62 | 1.25 |
| Aluminum powder | — | — | 8.85 | 1.04 |
| Toluene diisocyanate | 2.0 | 0.23 | 2.0 | 0.23 |

TABLE II-continued
TYPICAL COMPOSITIONS OF LINERS BASED ON POLYVINYL BUTYRAL RESINS

| | LINER COMPOSITION | | | |
|---|---|---|---|---|
| | A | A | B | B |
| | PARTS | PER-CENT | PARTS | PER-CENT |
| INGREDIENT | BY WT. | BY WT. | BY WT. | BY WT. |
| Isopropyl acetate | 522. | 59.72 | 513. | 60.21 |
| Isopropyl alcohol | 265. | 30.32 | 252. | 29.58 |
| | | 100.00 | | 100.00 |

*Butvar B-72A (Monsanto Chemical Company)
**ERL-4221 (Union Carbide Corporation)
***Resinox 433
Pliophen 5023
BKPA-5904

Reaction 2:

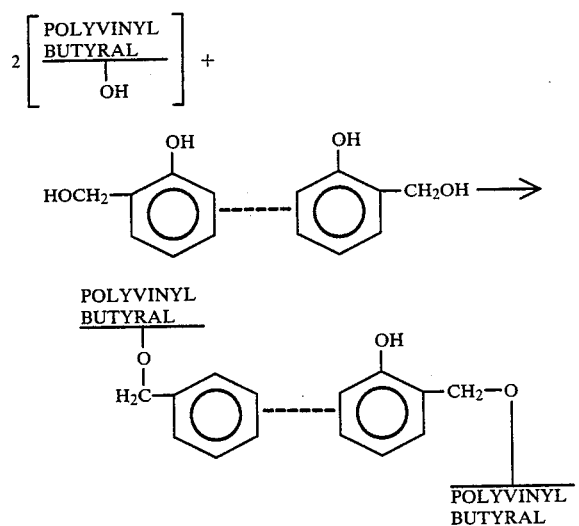

REACTION OF POLYVINYL BUTYRAL WITH PHENOL-FORMALDEHYDE RESINS

There are three closely related polyvinyl butyral resins, B-72A, B-76 and B-98 being manufactured on a commercial scale. The differences in vinyl alcohol content, vinyl acetate content, vinyl butyral content, and molecular weights are listed in Table 1 above.

The composition of embedment liners derived from the use of polyvinyl butyral resins which have been modified with epoxy or/and phenolic resins, crosslinked with a diisocyanate appears in Table II. Triphenylbismuthine is used to accelerate the crosslinking reaction by the polyisocyanate. In addition, the incorporation of leafing or non-leafing aluminum increases the barrier to migration, and thus reduces the amount of carboranylmethyl propionate that is imbibed by the liner.

The need for better embedment liners is dictated by the fact that the recently developed, crosslinked, carboranylmethyl propionate-containing, composite-modified, double-base propellants (such as GBZ propellant) have tensile strength values in the range of 350–400+ psi, as compared to the conventional double-base and composite propellants whose tensile strengths fall in the range of 200–250 psi. The increase in the propellant's tensile strength dictates the necessity of developing more effective adhesive liners so that failure of the bond at the interface of propellant and liner is least likely to occur, but any failure at all is likely to be strain failure which takes place in the propellant by means of a cohesive failure.

When failure does occur at the propellant-to-liner bond, the embedded granules are pulled out of the embedment resin, rather than by means of a cohesive failure within the propellant. The failure of the propellant-to-liner bond, naturally, is a more serious failure which is most likely to result in system failure.

The strength of the adhesion between the embedment granule and the fully-cured embedment resin is determined by measuring the load required to pull individual granules of of the resin. After the granule-embedded embedment resin is fully cured, a wire loop is placed around an individual granule, and a shear force is applied. The pulling action causes the resin to become released from the cylindrical surface of the granule. The force required to obtain the first indication of adhesive failure at a strain rate of 0.02 in/min is recorded. To normalize the adhesive force to a unit of area coverage of the granule, the cavity in the resin is sectioned, photographed, measured, and the area of resin coverage is calculated. One-half of this area is used, since the initial adhesive failure occurred only on one half of the cylinder, is used in the calculation of the adhesive force measured. The measured pulling force, after cure, is in the range of 100–120 g/mm$^2$.

The initial criterion that is used to screen a liner material is that it does not swell, deteriorate, or is not soluble in carboranylmethyl propionate while submerged in the borane compound for a minimum period of 3 days at a temperature of 135° F. The specimens are checked at regular intervals for swelling and deterioration. The results are presented in Table III, below.

TABLE III
LINER IMMERSION TESTS IN CARBORANYLMETHYL PROPIONATE

| IMMERSION DURATION (HOURS) | AVERAGE DIMENSIONAL CHANGES* (l = length; t = thickness) | | COMMENTS |
|---|---|---|---|
| | COMPOSITION A | COMPOSITION B | |
| 0 | l = 1.390 in<br>t = 0.325 in | l = 1.400 in<br>t = 0.325 in | |
| 24 | l = 1.395 in<br>t = 0.325 in | l = 0.405 in<br>t = 0.327 in | No changes in mechanical properties; Hardness retained |
| 48 | l = 1.395 in<br>t = 0.325 in | l = 1.405 in<br>t = 0.327 in | No change in mechanical properties; Hardness retained. |

*Due to swelling or imbibition of carboranylmethyl propionate

The quality of the liner bond is generally described in terms of its peel strength, Bond-in-Tension values, lap shear values, etc.

The test specimens are prepared in the following manner for the mechanical properties tests. It is done in this manner so that the test specimen has a relationship to the setup in an interceptor motor.

For the 90° peel test, styrene-butadine rubber (SBR) insulation of ¼ inch thickness is bonded to a steel plate. The embedment liner is then applied by brush-coating, and a canvas flap backing is then bonded to the liner. The materials are cured at ambient temperature for 24 hours. The specimen is then installed in an Instron tester, and the flap backing is pulled from one end. A comparison of mechanical properties of liners in Table IV below illustrates that peel and bond-in-tension values for composition A and B are superior to the values measured for like tests for the Sprint system liner.

TABLE IV

COMPARISON OF MECHANICAL PROPERTIES OF LINERS

| TEST | COMPOSITION A | COMPOSITION B | SPRINT |
|---|---|---|---|
| PEEL Substrate - SBR Crosshead Speed (2.0 in/min) Reading | 20–21 | 23–25 | 12–15 |
| BOND-IN-TENSION Substrate - SBR Crosshead Rate (2.0 in/min) Reading | 350–400 | 380–420 | 220–270 |

Test specimens for the preliminary evaluation were prepared by brush coating thin liner-barrier coats onto steel shims (0.002 inch thick) for the peel test and onto steel (1.5 inches diameter) test bars for the bond-in-tension test. The liner-barrier system is cured at 200° F. for one hour. The crosshead speed on the peel test is 0.1 inch per minute and for the bond-in-tension tests are 0.2 inch per minute.

The bond-in-tension test data results for above specimens were 75 psi, and failure only occured within the propellant as evidenced by a thick film of propellant being present on the liner-barrier-to-propellant interface.

Double-Lap shear tests were carried out. Samples are tested at three different temperatures (745°, 10°, and −20° F.). (These are equivalent to 0.2, 40, and 3300 inches per minute crosshead test speeds). A phenolic substrate was used. At a speed of 0.2 inch per minute, and 100 psi shear stress, the time to failure was 0.9 minutes; and the mode of failure was within the propellant with a thin film of propellant appearing on the liner-barrier interface. The reason that some of these specimens were tested at −20° F. was that this low temperature resulted in an increase in the propellant's modulus. This means a greater strain was placed on the propellant-to-liner interface.

The method, used in the fabrication of solid-propelled motors, which contain this liner involves the following fabrication procedure:

(1) The fiberglass BATES (Ballistic Test Motor) is lined with silicon dioxide-filled styrene-butadiene rubber (SBR) insulation to a film thickness of 35 mils;

(2) The surface of the insulation is then sprayed with the polyvinyl butyral resin to a depth of 20–44 mils;

(3) The resin is cured to the desired "B"-stage (This took 4½–5 hours at room temperature);

(4) 75 mil embedment propellant granules (length/diameter=1.0) is introduced through both ends of the beaker (beaker is term used in the art to describe the shape of the motor in cylindrical form such as a beaker);

(5) The beaker is rotated slowly for about 3 minutes to effect the uniform distribution of the embedment granules;*

(6) The excess propellant granules are removed by shaking them out of the beaker;

(7) 50-Mil embedment propellant granules (length/diameter=1) are introduced through both ends of the beaker;

(8) The beaker is again rotated for about 3 minutes;

(9) The excess propellant granules are then removed by being shaken out of the beaker;

(10) The embedment system is cured overnight (18 hours) at ambient temperature;

(11) The ambient cure temperature is followed by curing at 140° F. for 24 hours.

*The composition of the embedment granules which are used in the fabrication of these missile motors is closely similar to the propellant granules which are used in the fabrication of the propellant, but differ in composition. The following are the compositional differences: the embedment granules do not contain carboranylmethyl propionate, aluminum whiskers, and they contain larger-size ammonium perchlorate (10 and 20 micrometers rather than 1 micrometer).

The steps used in fabricating missile motors are as follows:

(I) The resin blend is "B"-staged so that the resin blend is polymerized to a level where no flow occurs, and the depth of embedment of the embedment granules is controlled by the amount and speed of rotation of the motor. Other factors, in addition to depth of embedment, are the following:

(a) the ideal depth of penetration of the embedment granules into the embedment resin is half the length of the granule; in the manner, half of each granule is embedded in the liner and the other half is available for interaction with the casting solvent;

(b) resin wicking characteristics are also critical since this is the amount of resin that will move upward around the granule during cure;

(c) the degree of uniformity of coverage of the surface of the resin by the granules exert a very strong influence on the quality of liner-to-propellant bond;

(d) an undesirable situation would result if the granule were to penetrate into the embedment resin completely, thus leaving no protruding portion of the granule to combine, both chemically and mechanically, with the propellant during the solvation and cure cycle of the propellant; and, (e) rotation of the motor case is necessary in order to uniformly distribute the granules over the embedment resin surface and to ensure that the granules become partially embedded into the resin blend.

A BATES grain is cast with the different embedment systems in sections. Samples of SBR patches are embedded at the same time that each section of the beaker is embedded. These patches are removed, and examined for quality of embedment.

A 2-inch ring is machined from each section of the BATES casting, and tested in a BATES motor. The SBR inhibitor burnout patterns for the polyvinyl butyral systems are decidedly superior to the SPRINT system. The latter showed about thirty areas of erosion ranging in size from ⅜-inch in diameter to 1½ inches in diameter. On the other hand, the inhibitor portion which is coated with the polyvinyl butyral resins showed little or no erosion.

The propellants used in conjunction with the liner-barrier system of this invention for its performance evaluation were a crosslinked composite-modified double-base propellant which contained 6% carboranylmethyl propionate, and a trisvinoxypropyl adduct-plasticized ethyl acrylateacrylic acid-based propellant which contained 9% carboranylmethyl propionate.

I claim:

1. An impermeable liner-barrier composition when cured for propellants containing a high content of carborane burning rate catalyst, said liner-barrier composition when uncured containing from about 8.90 to about 10.21 weight percent solids and a solvent blend of isopropyl acetate and isopropyl alcohol from about 89.99 to about 91.10 percent by weight, said weight percent solids comprising:

(i) polyvinyl butyral resin having a vinyl acetate of about 1.0 percent by weight, a vinyl alcohol content from about 11.0 to about 19.0 percent by weight, a vinyl butyral content from about 80.0 to about 88.0 percent by weight, and having an approximate molecular weight average from about 500 to about 3500, said polyvinyl butyral resin being present in an amount from about 4.60 to about 4.78 percent by weight;

(ii) 4,5-epoxycyclohexylmethyl 4', 5-epoxycyclohexyl carboxylate in an amount from about 1.52 to about 1.56 percent by weight;

(iii) novolac resin from about 1.35 to about 2.33 percent by weight;

(iv) triphenylbismuthine from about 1.22 to about 1.25 percent by weight;

(v) toluene diisocyanate of about 0.23 percent by weight; and, said solvent blend comprising: (vi) isopropyl acetate from about 59.72 to about 60.21 percent by weight; and (vii) isopropyl alcohol from about 29.58 to about 30.32 percent by weight.

2. The uncured liner-barrier composition as defined by claim 1 wherein said polyvinyl butyral resin is present in an amount of about 4.66 percent by weight; said 4,5-epoxycyclohexylmethyl 4',5-epoxycyclohexyl carboxylate is present in an amount of about 1.52 percent by weight; said novolac resin is present in an amount of about 2.33 percent by weight; said triphenylbismuthine is present in an amount of about 1.22 percent by weight; said isopropyl acetate is present in an amount of about 59.72 percent by weight; and wherein said isopropyl alcohol is present in an amount of about 30.32 percent by weight.

3. The uncured liner-barrier composition as defined by claim 1 wherein said polyvinyl butyral resin is present in an amount of about 4.78 percent by weight; said 4,5-epoxycyclohexylmethyl 4',5'-epoxycyclohexyl carboxylate is present in an amount of about 1.56 percent by weight; said novolac resin is present in an amount of about 1.35 percent by weight; said triphenylbismuthine is present in an amount of about 1.25 percent by weight; said isopropyl acetate is present in an amount of about 60.71 percent by weight; said isopropyl alcohol is present in an amount of about 29.58 percent by weight; and wherein aluminum powder is present as an additional ingredient in an amount of about 1.04 percent by weight.

* * * * *